United States Patent

Shinke et al.

[11] Patent Number: 6,051,909
[45] Date of Patent: Apr. 18, 2000

[54] DRIVE DEVICE USING ELECTROMECHANICAL TRANSDUCER

[75] Inventors: Satoshi Shinke, Sakai; Yasuhiro Okamoto, Tondabayashi; Ryuichi Yoshida, Sagamihara; Haruyuki Nakano; Junji Fujita, both of Sakai; Yoshitaka Sugimoto, Izumi, all of Japan

[73] Assignee: Minolta Co., Ltd., Osaka, Japan

[21] Appl. No.: 08/997,653

[22] Filed: Dec. 23, 1997

[30] Foreign Application Priority Data

Dec. 27, 1996 [JP] Japan ............................ 8-356688
Mar. 3, 1997 [JP] Japan ............................ 9-061697
Mar. 3, 1997 [JP] Japan ............................ 9-061698

[51] Int. Cl.$^7$ .............................. H02N 2/06; H02N 2/04
[52] U.S. Cl. ........................... 310/316.01; 310/323.01
[58] Field of Search ................. 310/316.01, 323.01, 310/323.09, 328, 323.17, 323.21

[56] References Cited

U.S. PATENT DOCUMENTS

| | | | |
|---|---|---|---|
| 4,195,243 | 3/1980 | Thaxter | 310/317 |
| 4,894,579 | 1/1990 | Higuchi et al. | 310/328 |
| 5,225,941 | 7/1993 | Saito et al. | 359/824 |
| 5,589,723 | 12/1996 | Yoshida et al. | 310/328 |
| 5,786,654 | 7/1998 | Yoshida et al. | 310/328 |
| 5,847,488 | 12/1998 | Yoshida et al. | 310/328 |
| 5,869,918 | 2/1999 | Ashizawa | 310/328 |
| 5,907,212 | 5/1999 | Okada | 310/328 |

*Primary Examiner*—Thomas M. Dougherty
*Attorney, Agent, or Firm*—McDermott, Will & Emery

[57] ABSTRACT

A drive device using an electromechanical transducer having inconsiderable loss of drive energy and excellent drive efficiency even with variation in load in which an elastic member is arranged between a driven member frictionally coupled to a drive member and a frictional member fitted to an opening of the driven member whereby drive force is transmitted from the drive member to the driven member with no loss of energy, a frictional force between the drive member and the driven member is periodically changed, an average frictional force is increased when a shift between a phase of variation in a drive velocity and a phase of variation in the frictional force is null, when the shift between the phases is 180°, the average frictional force is adjusted to decrease whereby the drive efficiency can be promoted, and when the device is stopped, the drive device can be protected against unintentional external force bringing the drive member and the driven member into fixing contact with each other by an electromechanical transducer.

14 Claims, 12 Drawing Sheets

PRIOR ART            Fig. 16
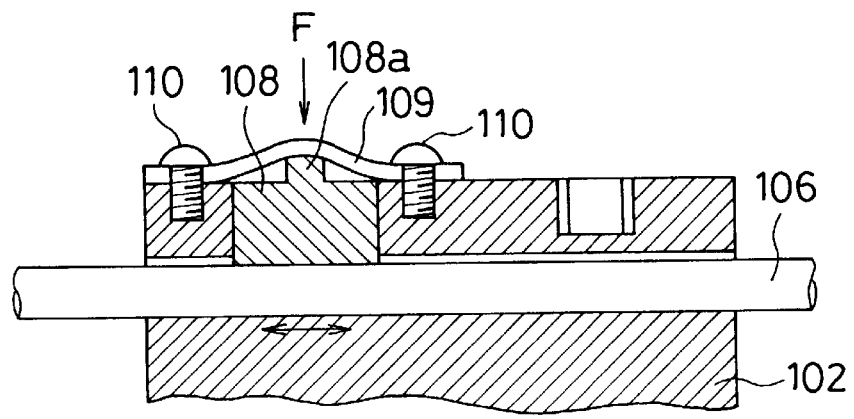
Fig. 17(a)
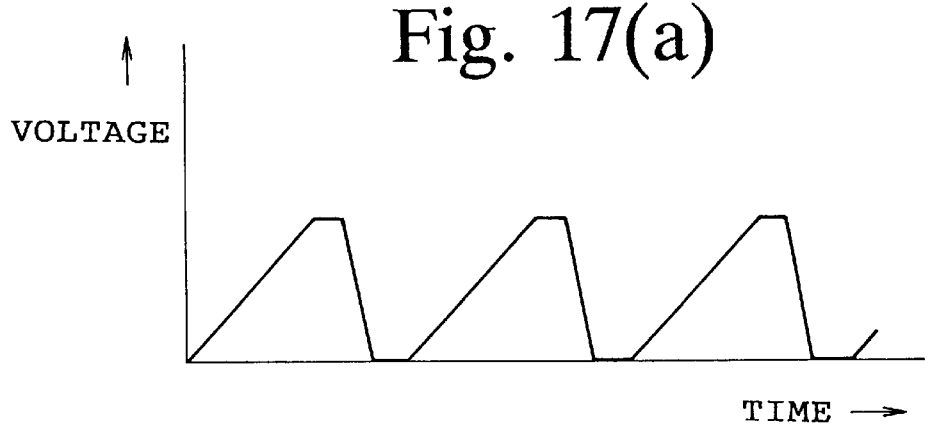
Fig. 17(b)
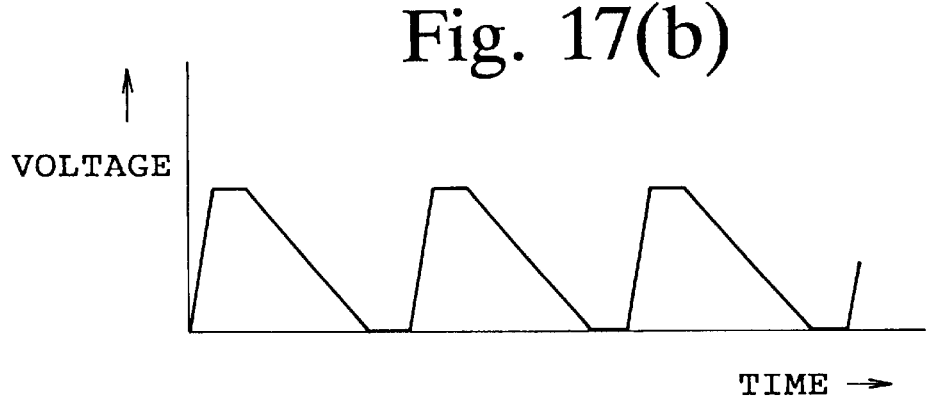

DRIVE DEVICE USING ELECTROMECHANICAL TRANSDUCER

BACKGROUND OF THE INVENTION

1. Field of the Invention

The present invention relates to a drive device using an electromechanical transducer suitable for driving general fine machine devices such as drive units of an XY drive table, a photographing lens of a camera, a projecting lens of an overhead projector, a lens for a binocular and the like.

2. Description of the Prior Art

Although a drive device using an electric motor has conventionally been used for driving or the like of an XY drive table or a photographing lens of a camera, inconvenience of enlargement of device, generation of magnetic field, generation of noise or the like has been pointed out. Hence, as means for solving such various problems, the applicant has proposed an actuator using an electromechanical transducer, that is, an actuator in which a moving member is frictionally coupled to a drive member that is fixedly coupled to an electromechanical transducer and displacements in elongation and contraction directions having different velocities are caused by applying drive pulses in a sawtooth-like waveform to the electromechanical transducer by which the moving member frictionally coupled to the drive member is moved in a predetermined direction.

FIG. 14 through FIG. 16 show an example of an actuator using the above-described electromechanical transducer. FIG. 14 is a perspective view showing the actuator by disassembling the actuator into constituent members, FIG. 15 is a perspective view showing an assembled state of the actuator and FIG. 16 is a sectional view showing the constitution of contact portions of a drive shaft, a slider block and a pad.

In FIG. 14 through FIG. 16, an actuator 100 is constituted by a frame 101, support blocks 103 and 104, a drive shaft 106, a piezoelectric element 105, a slider block 102 and the like. The drive shaft 106 is supported by a support block 103a and the support block 104 movably in the axial direction. One end of the piezoelectric element 105 is fixedly adhered to the support block 103 and the other end is fixedly adhered to one end of the drive shaft 106. The drive shaft 106 is supported displaceably in the axial direction (arrow mark "a" direction and direction opposed thereto) when a displacement in a thickness direction of the piezoelectric element 105 is caused.

The drive shaft 106 penetrates the slider block 102 in the horizontal direction, an opening 102a is formed at the upper portion of the slider block 102 which the drive shaft 106 penetrates and the upper half of the drive shaft 106 is exposed. A pad 108 which is brought into contact with the upper half of the drive shaft 106 is inserted and fitted to the opening 102a, a projection 108a is provided at the upper portion of the pad 108 and the projection 108a of the pad 108 is pushed down by a leaf spring 109 by which a downward urging force F for bringing the pad 108 into contact with the drive shaft 106 is applied on the pad 108. Incidentally, numeral 110 designates screws for fixing the leaf spring 109 to the slider block 102. The constitution of contact portions of the drive shaft 106, the slider block 102 and the pad 108 is apparent by referring to FIG. 16.

By the above-described constitution, the slider block 102 including the pad 108 and the drive shaft 106 are brought into press contact with each other and frictionally coupled by the urging force F of the leaf spring 109.

Next, an explanation will be given of the operation. First, when drive pulses in a sawtooth-like waveform each having a slowly rise portion and a rapidly fall portion as shown by FIG. 17(a) are applied to the piezoelectric element 105, the piezoelectric element 105 is slowly displaced to elongate in the thickness direction at the slowly rise portions of the drive pulses and the drive shaft 106 coupled to the piezoelectric element 105 is also slowly displaced in a positive direction (arrow mark "a" direction). At this moment, the slider block 102 frictionally-coupled to the drive shaft 106 is moved in the positive direction along with the drive shaft 106 by a frictional coupling force.

At the rapidly fall portion of each of the drive pulses, the piezoelectric element 105 is rapidly displaced to contract in the thickness direction and the drive shaft 106 coupled to the piezoelectric element 105 is also rapidly displaced in a negative direction (direction opposed to arrow mark "a"). At this moment, the slider block 102 frictionally-coupled to the drive shaft 106 substantially remains at the position and is not moved by overcoming the frictional coupling force by inertia. By continuously applying the drive pulses to the piezoelectric element 105, the slider block 102 can continuously be moved in the positive direction.

Incidentally, the expression "substantially" used here includes a motion moving in the arrow mark "a" direction as a whole by a difference in drive time periods in either of the positive direction and the direction opposed thereto where the slider block 102 follows the drive shaft 106 while causing slippage between frictional coupling faces of the slider block 102 and the drive shaft 106.

In moving the slider block 102 in the opposed direction (direction opposed to arrow mark "a"), the waveform of the sawtooth drive pulses applied on the piezoelectric element 105 is changed and drive pulses each comprising a rapidly rise portion and a slowly fall portion as shown by FIG. 17(b) are applied by which the movement can be achieved.

According to the actuator explained above, the pad 108 that is brought into contact with the upper half of the drive shaft 106 is inserted and fitted to the opening 102a at the upper portion of the slider block 102 and although a fitting clearance between the opening 102a and the pad 108 is set to be as small as possible, a clearance necessary for assembly operation remains.

Meanwhile, if there is a clearance between the slider block 102 and the pad 108, when the drive shaft 106 is moved in the axial direction, the pad 108 is moved by an amount of the clearance along with the drive shaft 106 and drive energy received from the drive shaft 106 is not sufficiently transmitted to the slider block 102 whereby loss of drive energy is caused.

Further, in order to make the fitting clearance between the opening 102a and the pad 108 as small as possible, the opening 102a and the pad 108 need to be fabricated with high finishing accuracy which results in an increase in cost. Further, there is a fabricating means of press-fitting the pad 108 into the opening 102a or the like to nullify the fitting clearance. However, when the fitting clearance is nullified by such a fabricating means, there causes inconvenience in which a pertinent frictional force cannot be provided between the pad 108 and the drive shaft 106 by pushing down the pad 108 by the leaf spring 109.

Further, according to the actuator explained above, the frictional force caused between the slider block and the pad, and the drive shaft, is produced by the downward urging force F of the leaf spring in which the leaf spring having a pertinent modulus of elasticity capable of producing an optimum frictional force in accordance with anticipated load is selected and fine adjustment of the frictional force is carried out by the screws 110 for fixing the leaf spring 109. The constitution is simple and functions sufficiently when variation in load is inconsiderable.

However, the frictional force is varied in accordance with load and therefore, the actuator having the above-described constitution cannot efficiently correspond to usage having a large amount of variation of load and the drive efficiency is lowered.

According to the actuator explained above, the slider block (driven member) is frictionally coupled to the drive shaft when the slider block is not driven. As is apparent from the operational mode of the actuator, the slider block follows the drive shaft while causing slippage between the frictional coupling faces of the slider block and the drive shaft. Therefore, the frictional coupling force is not strong and the slider block is easily moved when external force is applied to the slider block. Accordingly, when unintentional external force is applied to the slider block, the slider block may be unpreparedly moved, the actuator may be destructed or parts driven by the actuator may be destructed.

SUMMARY OF THE INVENTION

It is a principal object of the present invention to provide a drive device using an improved electromechanical transducer and having inconsiderable drive energy loss and excellent drive efficiency even under variation in load.

It is another object of the present invention to provide a drive device using an improved electromechanical transducer capable of adjusting frictional force between frictional coupling portions of a drive element and a driven element in accordance with load and capable of driving always with high drive efficiency.

It is another object of the present invention to provide a drive device using an improved electromechanical transducer for protecting a drive device against unintentional external force when the drive device is not operated.

Other objects of the present invention will be clarified through a detailed explanation of the present invention in reference to the drawings.

BRIEF DESCRIPTION OF THE DRAWINGS

FIG. 16 is a sectional view showing the constitution of a frictional coupling portion of the conventional actuator; and FIGS. 17(*a*) and 17(*b*) are diagrams for explaining waveforms of drive pulses.

DETAILED DESCRIPTION OF THE PREFERRED EMBODIMENTS

An explanation will be given of embodiments of the present invention as follows. First, although an actuator of the present invention is similar to the constitution explained above in the conventional technology, the constitution of the slider block and the pad portion is different from that in the conventional example.

Figure 1:
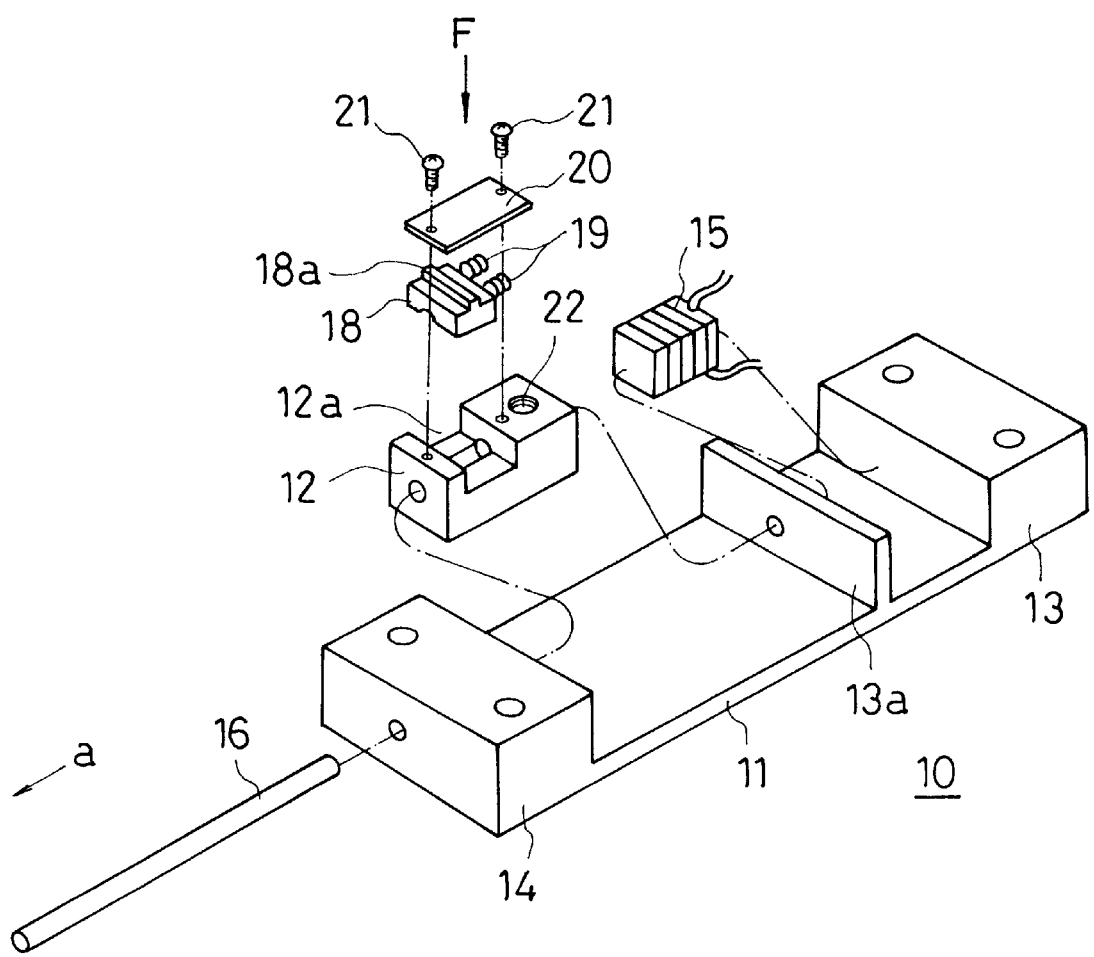
FIG. 1 is a perspective view of disassembled constituent members of an actuator according to the present invention.
Figure 2:
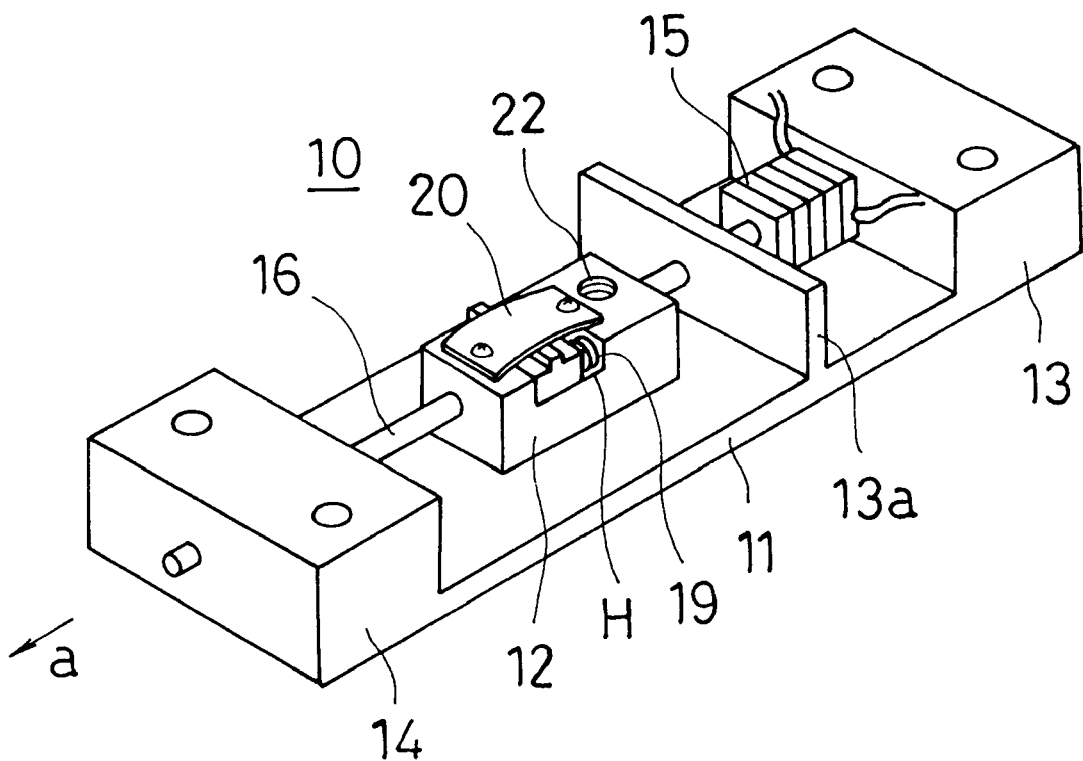
FIG. 2 is a perspective view showing an assembled state of the actuator shown by FIG. 1.
Figure 3:
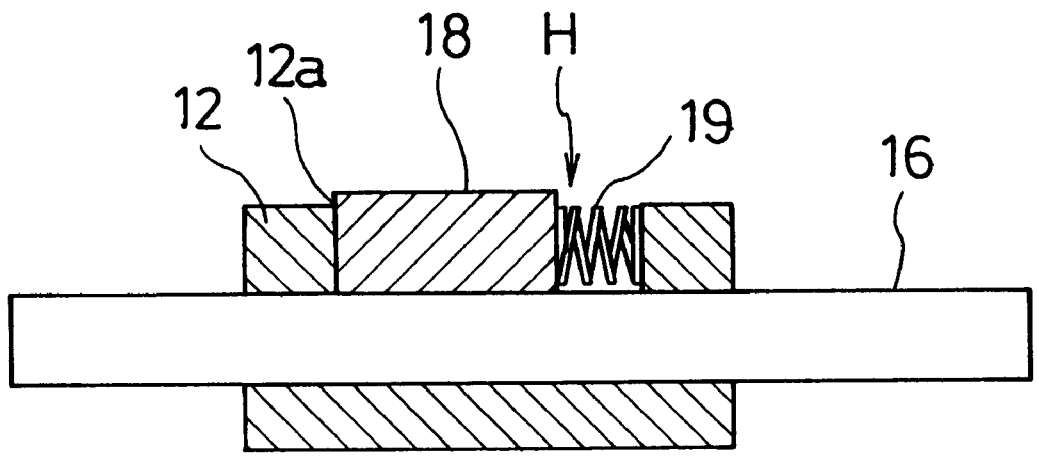
FIG. 3 is a sectional view showing the constitution of a frictional coupling portion of the actuator shown by FIG. 1.

FIG. 1 is a perspective view showing a disassembled state of constituent members of an actuator according to the present invention, FIG. 2 is a perspective view showing an assembled state of the actuator shown in FIG. 1 and FIG. 3 is a sectional view showing the constitution of the frictional coupling portions of the drive shaft, a slider block and a pad.

In FIG. 1 and FIG. 2, an actuator 10 is constituted by a frame 11, support blocks 13 and 14, a drive shaft 16, a piezoelectric element 15, a slider block 12 and the like. The drive shaft 16 is supported by a support block 13*a* and the support block 14 movably in the axial direction. One end of the piezoelectric element 15 is fixedly adhered to the support block 13 and the other end is fixedly adhered to one end of the drive shaft 16. The drive shaft 16 is supported displaceably in the axial direction (arrow mark "a" direction and direction opposed thereto) when a displacement is caused in a thickness direction of the piezoelectric element 15.

As shown by the perspective view of FIG. 1 and the sectional view of FIG. 3, according to the constitution of frictional coupling portions where the slider block 12 and the pad 18 are frictionally coupled to the drive shaft 16, the drive shaft 16 penetrates the slider block 12 in the horizontal direction, an opening 12*a* is formed at the upper portion of the slider block 12 which the drive shaft 16 penetrates and the upper half of the drive shaft 16 is exposed. Further, the pad 18 that is brought into contact with the upper half of the drive shaft 16 is fitted and inserted into the opening 12*a*, a projection 18*a* is provided at the upper portion of a pad 18 and the projection 18*a* of the pad 18 is pushed down by a leaf spring 20 by which a downward urging force F for bringing the pad 18 into contact with the drive shaft 16 is applied to the projection 18*a*. The slider block 12 including the pad 18 and the drive shaft 16 are brought into press contact and frictionally coupled with each other by the urging force F of the leaf spring 20.

Incidentally, numeral 21 designates screws for fixing the leaf spring 20 to the slider block 12 and the urging force F of the leaf spring 20 can be adjusted by adjusting an amount of fastening the screws 21. Further, a screw hole 22 is a screw hole for attaching the slider block 12 to a member that is an object of movement.

An explanation will be given of the constitution of the frictional coupling portion where the slider block 12 and the pad 18 are frictionally coupled to the drive shaft 16 and modified examples thereof in reference to FIG. 3 through FIG. 6. Incidentally, in FIG. 3 through FIG. 6, illustration of the leaf spring 20 for pushing down the pad 18 is omitted in the drawings.

As shown by FIG. 3, there is a gap H between the slider block 12 and the pad 18 and helical springs 19 are inserted in the gap H. Thereby, the pad 18 is brought into contact with the upper half of the drive shaft 16 while maintaining a state where the pad 18 is brought into contact with the slider block 12 by being pushed to the left side of FIG. 3. Therefore, the displacement in the axial direction that is caused in the drive shaft 16 by displacement of elongation and contraction of the piezoelectric element 15, is transmitted to the slider block 12 and the pad 18 with no waste.

Figure 4:
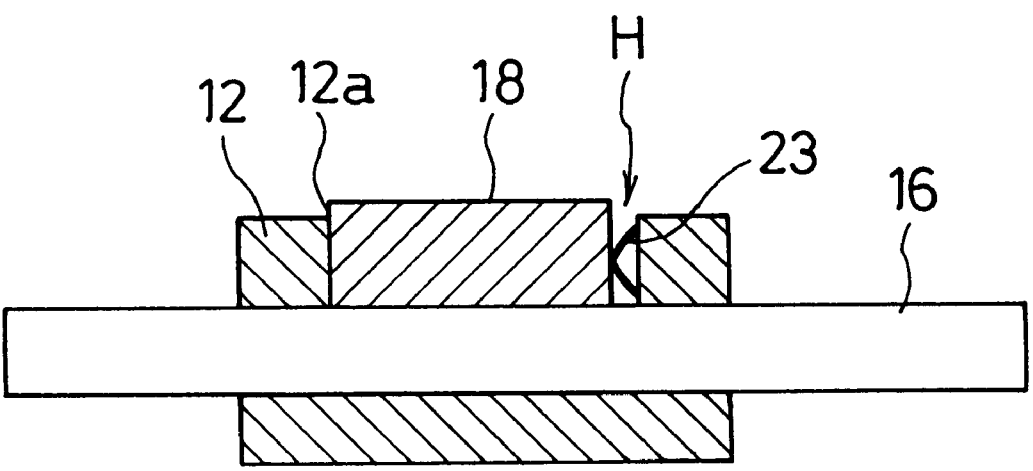
FIG. 4 is a sectional view showing other example of the constitution of the frictional coupling portion.
Figure 5:
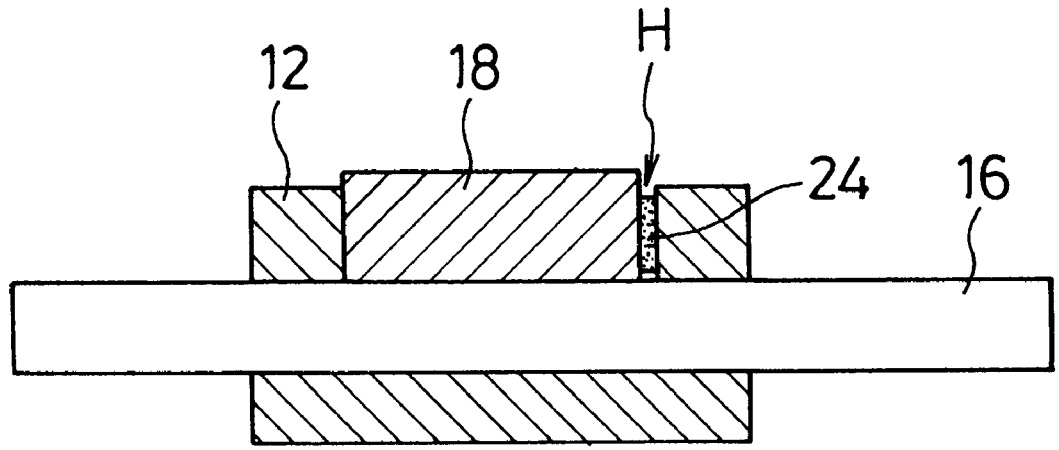
FIG. 5 is a sectional view showing other example of the constitution of the frictional coupling portion.
Figure 6:
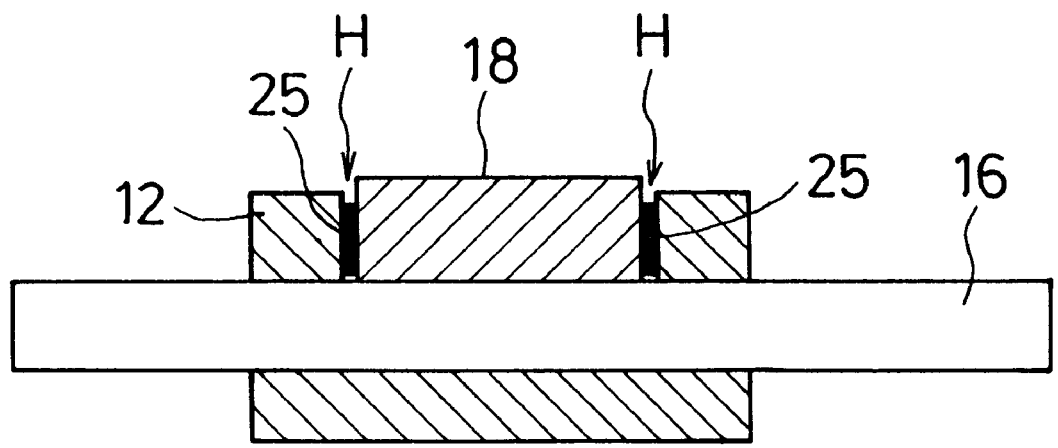
FIG. 6 is a sectional view showing other example of the constitution of the frictional coupling portion.

Although the helical springs 19 are inserted into the gap H between the slider block 12 and the pad 18 explained above, a member inserted into the gap H is not limited to a helical spring. FIG. 4 through FIG. 6 show other examples of members inserted into the gap H. According to the constitution shown by FIG. 4, a leaf spring 23 is inserted into the gap H and similar to the helical springs, the leaf spring 23 presses the pad 18 to the left side of FIG. 4 and the pad 18 is maintained in a state where the pad 18 is brought into contact with the slider block 12.

According to the constitution of FIG. 5, a synthetic resin plate 24 is press-fitted into the gap H in which the synthetic resin plate 24 presses the pad 18 to the left side of FIG. 5 by utilizing elasticity of the synthetic resin plate 24 whereby the pad 18 is maintained in a state where the pad 18 is brought into contact with the slider block 12.

Table 1 shows a result of an experiment of comparing drive velocities in the case where the synthetic resin plate is press-fitted to the gap H and the case where the synthetic resin plate is not press-fitted to the gap H.

As a material of the synthetic resin plate, urethane resin, silicone resin, vinyl resin, polyamideimide resin or the like as well as rubber or the like is pertinent and the material may be constituted by one kind or two kinds or more of materials selected from these materials.

TABLE 1

| Load | Case of not press-fitting synthetic resin plate | Case of press-fitting synthetic resin plate |
|---|---|---|
| 40 g | 23 mm/sec | 31 mm/sec |
| 60 g | 18 mm/sec | 23 mm/sec | where
thickness of synthetic resin plate; 0.1 mm,
modulus of elasticity; about 200 kgf/mm$^2$,
spring constant; about 1000 kgf/mm.

In view of the above-described experimental results, it is preferable that the spring constant is 200 kgf/mm$^2$ or more when the thickness of the synthetic resin plate is 0.1 mm and an effect was recognized even when the spring constant was 20 kgf/mm. Further, when the thickness of the synthetic resin plate was thin, an effect was recognized even with a resin material having further smaller modulus of elasticity.

In this case, when a frictional force between a drive member and a driven member is designated by notation F and a displacement (amplitude) of a drive shaft is designated by notation x, in order to prevent the pad 18 from vibrating by elongation and contraction displacement (vibration) in the axial direction of the drive shaft, a spring constant k in a direction of displacing elastic members such as the helical spring, the leaf spring, the synthetic resin plate or the like inserted into the gap H, seems to need to satisfy at least a condition shown by the following equation (1).

$$k > F/x \quad (1)$$

According to a result of an experiment, it has been found that it is effective in promoting the function of a linear actuator using this kind of piezoelectric element that the spring constant k in the direction of displacing the elastic member satisfies a condition shown by the following equation (2).

$$k > F/10x \quad (2)$$

According to the constitution shown by FIG. 6, a synthetic resin material 25 in a liquid state is injected under pressure into gaps H at the left and right of the pad 18 whereby the pad 18 is maintained in a state where the pad 18 is brought into contact with the slider block 12 by the elasticity of the filled and solidified synthetic resin material 25. According to the constitution, loss of energy derived from generation of noise or heat caused by impacting the pad 18 to the slider block 12 in the driving operation can be restrained. Further, the assembling operation is facilitated since the synthetic resin material is injected under pressure.

The driving operation of the actuator described above is the same as the driving operation of the actuator explained in the conventional technology in which by applying to the piezoelectric element 15 drive pulses in a sawtooth-like waveform each having a slowly rise portion and a rapidly fall portion as shown by FIG. 17(*a*), or drive pulses in a sawtooth-like waveform having a rapidly rise portion and a slowly fall portion as shown by FIG. 17(*b*), the slider block 12 frictionally coupled to the drive shaft 16 can be driven in predetermined directions.

Next, an explanation will be given of a second example having the constitution of portions where the slider block and the pad are frictionally coupled with the drive shaft. According to the frictional coupling portions shown by FIG. 3 through FIG. 6 explained above, the drive shaft 16 penetrates the slider block 12 in the horizontal direction, the pad 18 that is brought into contact with the upper half of the drive shaft 16 is inserted into the opening 12*a* of the upper portion of the slider block 12 which the drive shaft 16 penetrates, the pad 18 is pushed down by the leaf sprig 20 and the pad 18 is applied with the downward urging force F for bringing the pad 18 in contact with the drive shaft 16.

According to the constitution, the frictional force produced between the slider block and the pad, and the drive shaft is caused by the downward urging force F of the leaf spring, a leaf spring having a pertinent modulus of elasticity is selected such that an optimum frictional force is generated in accordance with anticipated load and fine adjustment of the frictional force is carried out by the screws 21 for fixing the leaf spring 20. The constitution is simple and functions sufficiently in the case where the variation of load is inconsiderable.

Figure 7:
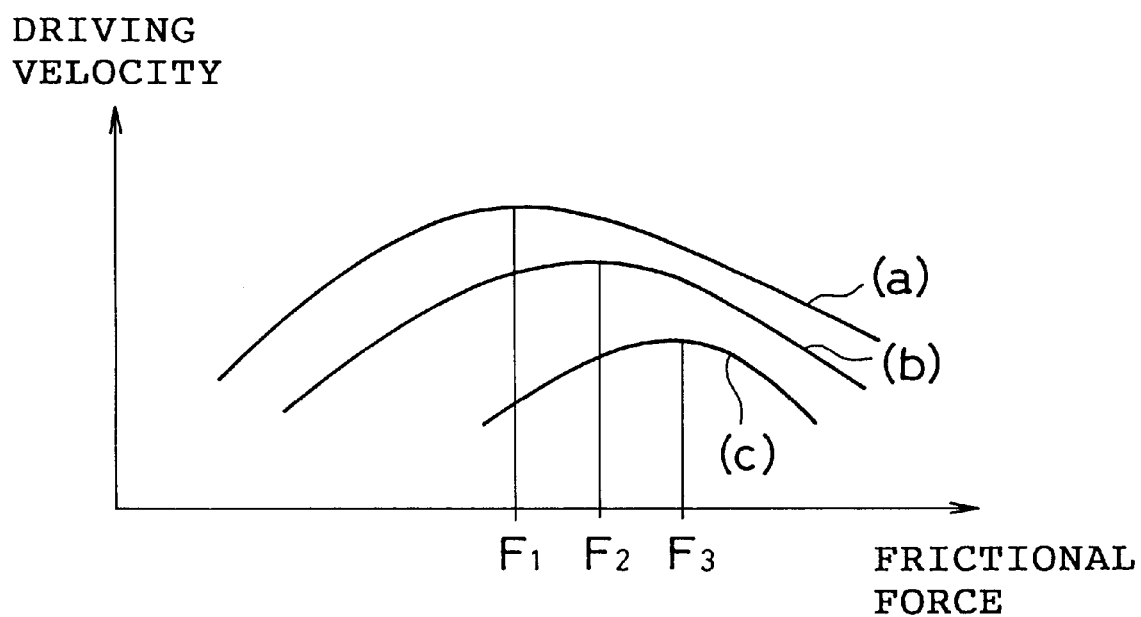
FIG. 7 is a diagram for explaining a state where an optimum frictional force is varied in accordance with load.

However, an optimum frictional force for providing a maximum drive velocity is varied in accordance with load as shown by FIG. 7. That is, when the load is small, as shown by a line (a), the maximum driving velocity is obtained when the frictional force is F1, when the load is large, as shown by a line (c), the maximum driving velocity is obtained when the frictional force is F3 and at a load therebetween, as shown by a line (b), the maximum driving velocity is obtained when the frictional force is F2.

Therefore, the constitution of portions for frictionally coupling the slider block and the pad with the drive shaft as shown by FIG. 3 through FIG. 6, mentioned above, is not pertinent for usage where load is varied. According to a second example and a third example explained below, the urging force F of the frictional coupling portions can be adjusted finely and an optimum frictional force can be produced in accordance with a variation in load.

Figure 8:
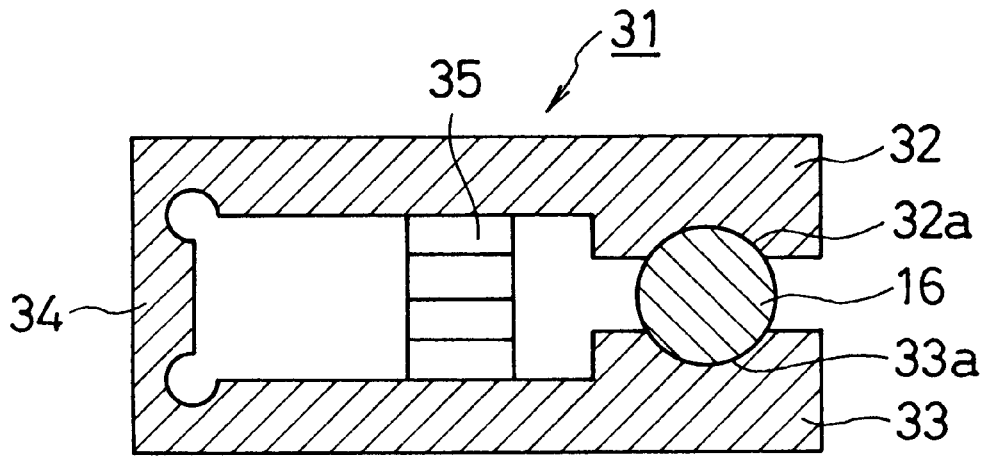
FIG. 8 is a sectional view showing a second example of the constitution of the frictional coupling portion.

FIG. 8 is a sectional view showing a second example of the constitution of frictional coupling portions and is a sectional view thereof taken from a face orthogonal to the axial direction of the drive shaft. Numeral 31 designates a slider block, a section of which is formed in a substantially U-like shape and which is provided with two fork-like members 32 and 33 that are coupled by a hinge portion 34. Coupling portions 32a and 33a each having a frictional coupling face in a circular arc shape directed toward the inner side of the substantially U-like shape, are formed at positions proximate to opening ends of the fork-like members 32 and 33. The two fork-like members 32 and 33 are urged in a direction of closing the fork-like members 32 and 33 by the elasticity of the hinge portion 34 and the drive shaft 16 penetrating the coupling portions 32a and 33a is held by strong frictional coupling therewith.

Further, a piezoelectric element 35 is arranged at the fork-like members 32 and 33 of the slider block 31 at a position remote from the coupling portions 32a and 33a and the fork-like members 32 and 33 are fixedly adhered to end portions of the piezoelectric element 35 in directions of elongation and contraction thereof. When a voltage is applied to the piezoelectric element 35 and elongation displacement is caused, the coupling portions 32a and 33a can be displaced in a direction of leaving the drive shaft 16. By adjusting the magnitude of the elongation displacement caused by the piezoelectric element 35, the urging force F for bringing the coupling portions 32a and 33a in press contact with the drive shaft 16, is adjusted whereby an optimum frictional force in accordance with load can be produced.

Figure 9:
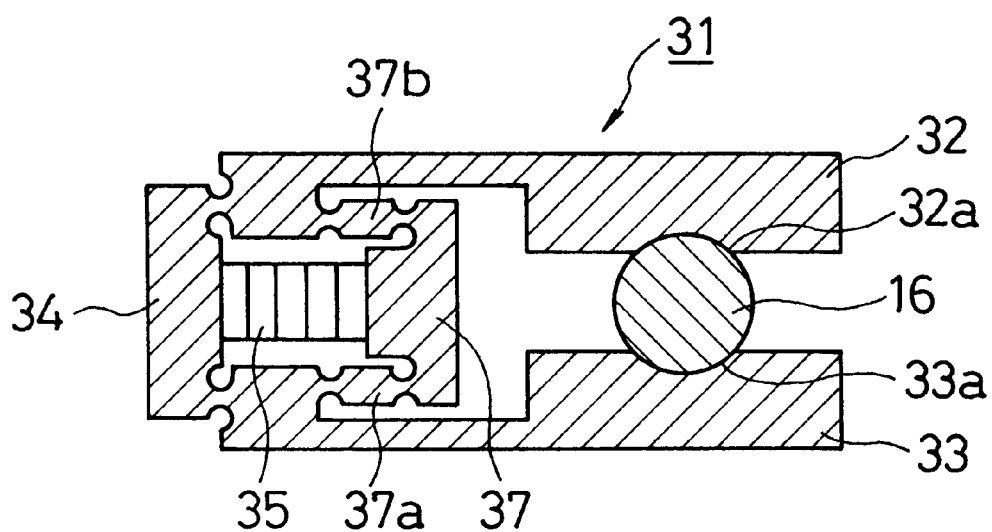
FIG. 9 is a sectional view showing a third example of the constitution of the frictional coupling portion.

FIG. 9 is a sectional view showing a third example of the constitution of frictional coupling portions and is a section view thereof taken from a face orthogonal to the axial direction of the drive shaft. Numeral 31 designates a slider block, a section of which is formed substantially in a U-like shape and which is provided with two fork-like members 32 and 33 coupled by a hinge portion 34. Further, the coupling portions 32a and 33a each having a circular arc face directed toward the inside of the substantially U-like shape, are formed at the fork-like members 32 and 33 at positions proximate to opening ends of the fork-like members 32 and 33 and the drive shaft 16 is frictionally coupled with the coupling portions 32a and 33a by penetrating the coupling portions 32a and 33a. The above-described points are not changed from the second constitution described above.

The fork-like members 32 and 33 of the slider block 31 are not only coupled by the hinge portion 34 but are coupled by an operational member 37 having two arms 37a and 37b which are coupled to the fork-like members 32 and 33 at positions proximate to the hinge portion 34 and the piezoelectric element 35 is arranged between the hinge portion 34 and the operational member 37 and fixedly adhered thereto. The two fork-like members 32 and 33 are urged in a direction of closing the fork-like members 32 and 33 by the elasticity of the hinge portion 34 and the drive shaft 16 penetrating the coupling portions 32a and 33a are held by the coupling portions 32a and 33a by strong frictional coupling therebetween.

When elongation displacement is caused by applying a voltage to the piezoelectric element 35, the operational member 37 is moved in a direction of leaving the hinge portion 34. The motion is magnified via the arms 37a and 37b and the two fork-like members 32 and 33 are displaced in the direction of leaving the drive shaft 16. By adjusting the magnitude of the elongation displacement caused by the piezoelectric element 35, the urging force F for bringing the coupling portions 32a and 33a into press contact with the drive shaft 16 can be adjusted and an optimum frictional force in accordance with load can be produced.

Furthermore, by the constitution shown in FIG. 8 and FIG. 9, elongation displacement of the piezoelectric element 35 is reduced when no voltage is applied to the piezoelectric element 35 or electric charge on the piezoelectric element 35 is discharged.

Then, frictional coupling portions 32a and 33a provided on the slider block 31 are coupled strongly with the drive shaft 16 by the elasticity of the hinge portion 34.

That is, slider block 31 is not moved unintentionally in the condition of no voltage is applied to the piezoelectric element 35.

Next, an explanation will be given of the constitution of fixing the actuator to the drive shaft such that when the actuator stops driving, the slider block is prevented from moving unintentionally.

Figure 10:
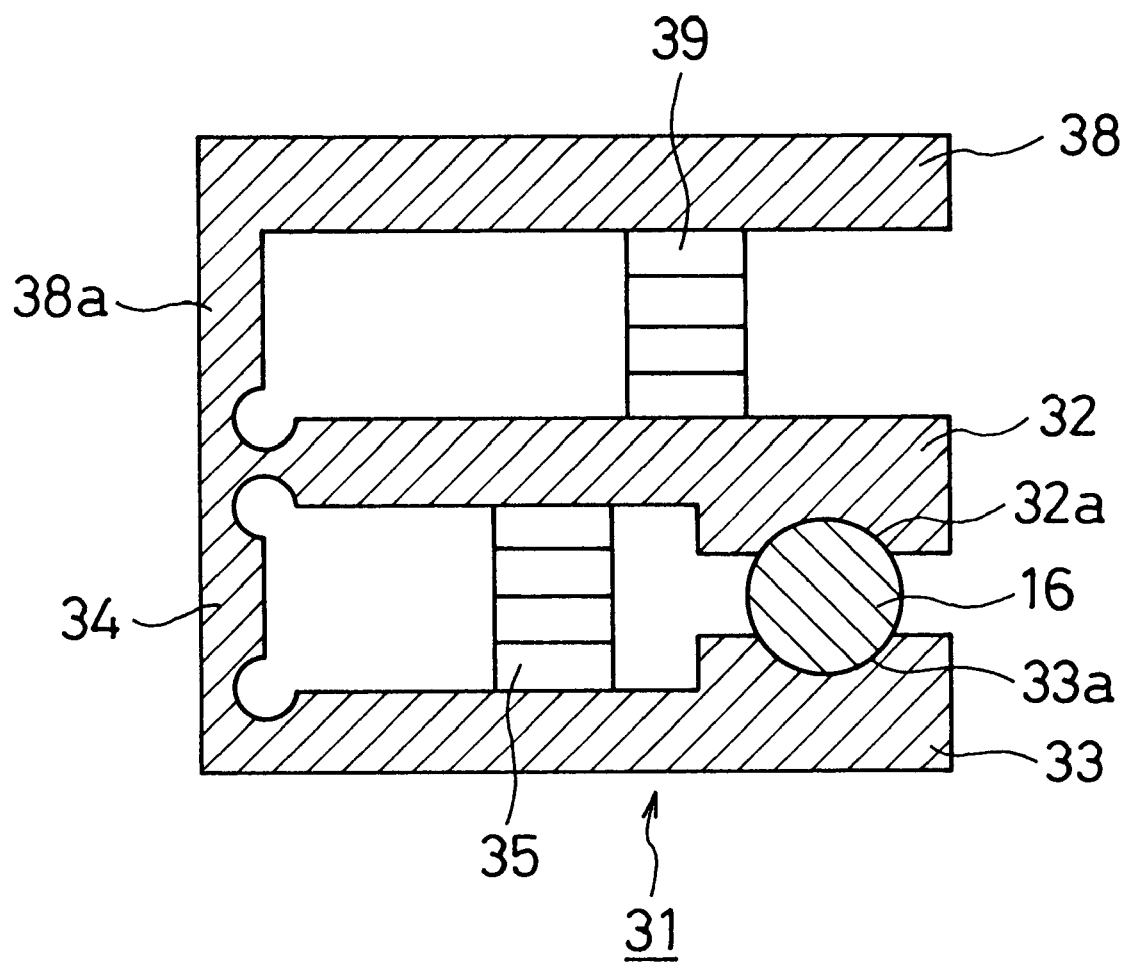
FIG. 10 is a sectional view showing the constitution of fixing a drive shaft to a frictional coupling portion.

FIG. 10 is a sectional view showing the constitution of frictional coupling portions for fixing the slider block to the drive shaft and is a sectional view taken from a face orthogonal to the axial direction of the drive shaft. This constitution is the constitution of the second frictional coupling portion shown by FIG. 8, added with a constitution of fixing the slider block to the drive shaft. The same notations are attached to portions the same as those in the constitution of the frictional coupling portion shown by FIG. 8, a detailed explanation thereof will be omitted and an explanation will be given of constituent portions for fixing the slider block.

Numeral 31 designates a slider block having two fork-like members 32 and 33 coupled by a hinge portion 34. The two fork-like members 32 and 33 are urged in the direction of closing the fork-like members 32 and 33 by the elasticity of the hinge portion 34 and the drive shaft 16 penetrating the coupling portions 32a and 33a are held by the coupling portions 32a and 33a by strong frictional coupling.

An arm member 38 is provided at a side of the fork-like member 32 opposed to the side of the drive shaft 16 for fixing the slider block to the drive shaft and is coupled to the hinge portion 34 by a hinge portion 38a. A piezoelectric element 39 is arranged between the fork-like member 32 and the arm member 38 and both ends of the piezoelectric element 39 are respectively and fixedly adhered to the fork-like member 32 and the arm member 38.

When the slider block is fixed to the drive shaft, a voltage is applied to the piezoelectric element 39 and elongation displacement is caused in the thickness direction of the piezoelectric element 39. Thereby, the fork-like member 32 is pushed down to the lower side of FIG. 10, the drive shaft 16 is strongly pressed by coupling portions 32a and 33a and the slider block 31 can be fixed to the drive shaft 16. Application of voltage to the piezoelectric element 39 is stopped in order to release the fixed state.

Figure 11:
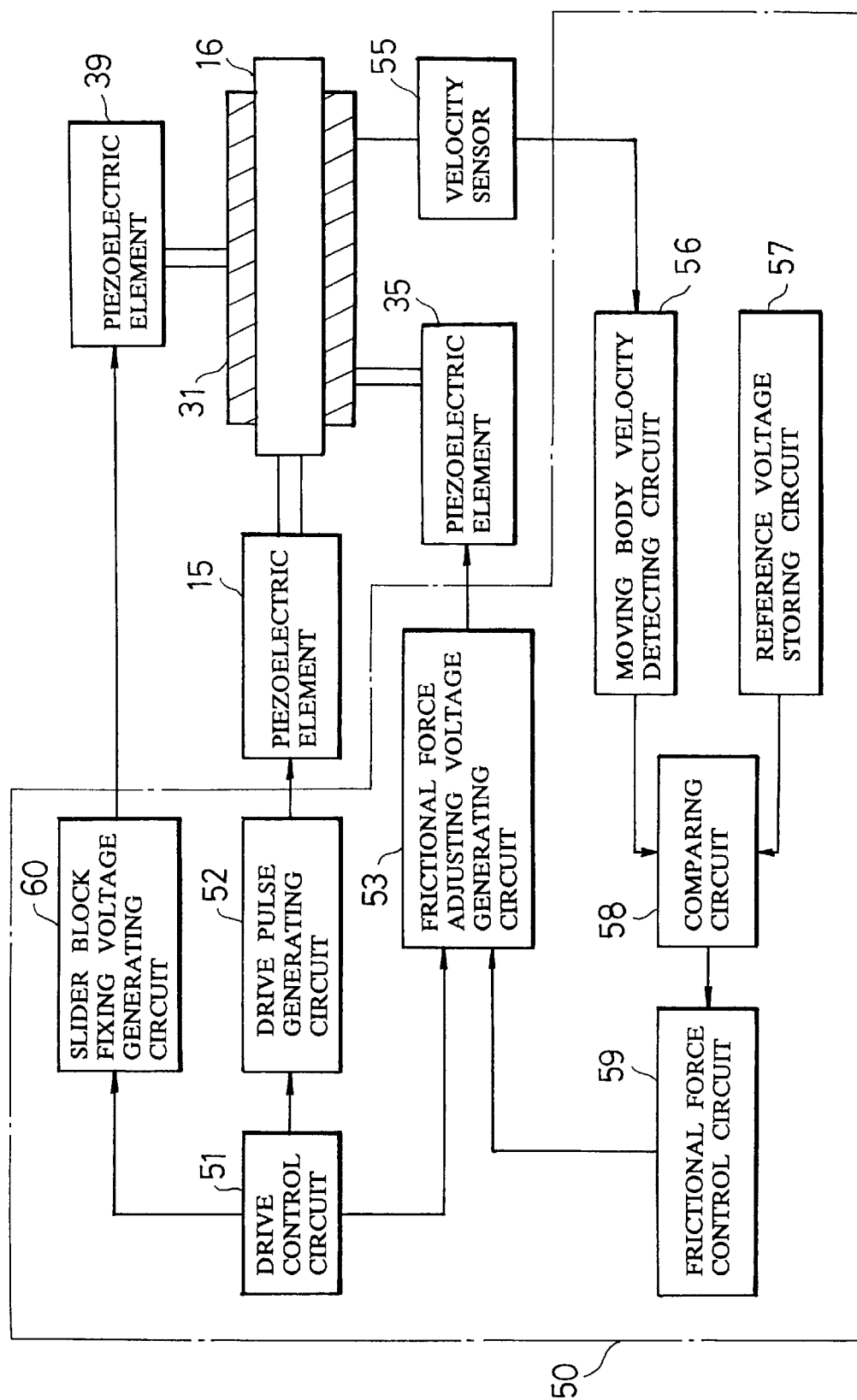
FIG. 11 is a block diagram of a control circuit of an actuator.

FIG. 11 is a block diagram showing a control circuit of an actuator. The control circuit 50 is provided with the second frictional coupling portions shown by FIG. 8 or the third frictional coupling portions shown by FIG. 9 and is applicable to the constitution added with the constitution of fixing the slider block to the drive shaft shown by FIG. 10.

The control circuit 50 is constituted by a drive control circuit 51, a drive pulse generating circuit 52, a frictional force adjusting voltage generating circuit 53, a moving body velocity detecting circuit 56 for calculating the drive velocity of the slider block, a reference velocity storing circuit 57 for storing predetermined reference velocity data, a comparing circuit 58, a frictional force control circuit 59 and a slider block fixing voltage generating circuit 60. Further, a velocity sensor 55 for detecting the moving velocity of the slider block is arranged at the vicinity of the slider block 31.

Next, an explanation will be given of the operation. The drive pulse generating circuit 52 generates drive pulses in the sawtooth-like waveform each having a slowly rise portion and a rapidly fall portion as shown by FIG. 17(*a*) or a rapidly rise portion and a slowly fall portion as shown by FIG. 17(*b*) under control of the drive control circuit 51. The generated drive pulses are applied to the piezoelectric element 15 by which the slider block 31 is driven in predetermined directions.

The moving velocity of the slider block 31 is detected by the velocity sensor 55 and the drive velocity is calculated at the moving body velocity detecting circuit 56. The calculated drive velocity is compared with the reference velocity read from the reference velocity storing circuit 57 at the comparing circuit 58. A result of comparison is inputted to the frictional force control circuit 59 where the frictional force adjusting data is determined based on the inputted comparison result and is inputted to the frictional force adjusting voltage generating circuit 53.

The frictional force adjusting voltage generating circuit 53 determines the magnitude of voltage applied to the piezoelectric element 35 for adjusting the frictional force based on the inputted frictional force adjusting data under the control of the drive control circuit 51 and the voltage is applied to the piezoelectric element 35. A displacement in accordance with the applied voltage is caused in the piezoelectric element 35, the urging force for bringing the coupling portions 32*a* and 33*a* into press contact with the drive shaft 16, that is, the frictional force is adjusted and an optimum frictional force in accordance with load can be generated.

Further, when an instruction signal of fixing the slider block to the drive shaft is outputted from the drive control circuit 51 to the slider block fixing voltage generating circuit 60, a voltage necessary for fixing the slider block to the drive shaft is outputted from the circuit 60 and is applied to the piezoelectric element 39. A displacement is caused in the piezoelectric element 39 based on the applied voltage, the fork-like member 32 is pushed down to the lower side of FIG. 10, the drive shaft 16 is strongly brought into press contact with the coupling portions 32*a* and 33*a* and the slider block 31 is fixed to the drive shaft 16.

The actuator according to the present invention is constituted such that the frictional force between the drive shaft and the slider block can be adjusted to an optimum value in accordance with load. However, even when the frictional force is adjusted, the slider block is moved in a predetermined direction while causing slippage between the slider block and the drive shaft and accordingly, the frictional force between the drive shaft and the slider block is periodically varied under the drive state, the drive velocity of the slider block is also varied periodically and therefore, when the width of variation of the drive velocity exceeds a predetermined allowable value, smooth driving operation cannot be performed.

According to such a mode of movement, it has been found that when the frictional force between the slider block and the drive shaft is periodically changed, for example, in a sine wave shape at a frequency significantly lower than the frequency of the drive pulses of the piezoelectric element for driving the slider block, for example, at a low frequency of about 10 Hz when the frequency of the drive pulses is 25000 Hz, the frictional force between the drive shaft and the slider block can be adjusted in accordance with load and smooth driving operation can be performed.

Figure 12A:
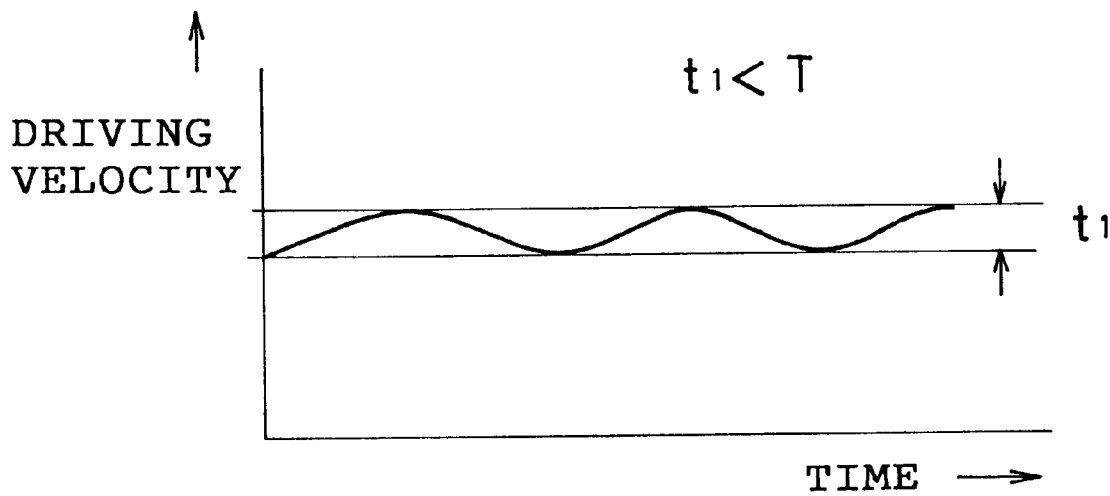
FIGS. 12(*a*) and 12(*b*) are diagrams for explaining variations in drive velocities.
Figure 12B:
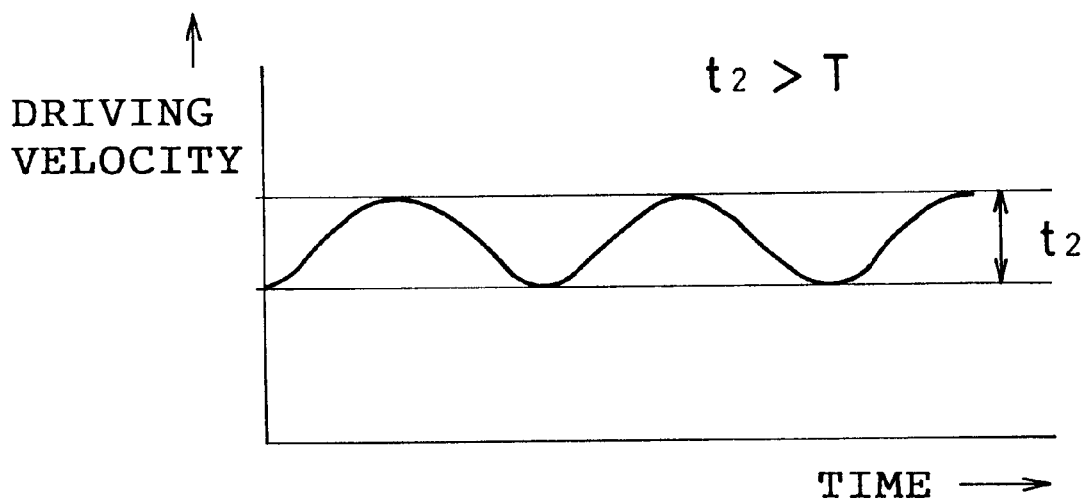

FIGS. 12(*a*) and 12(*b*) are diagrams for explaining the operation of the frictional force control circuit 59. That is, in changing periodically the frictional force between the slider block and the drive shaft, it is not necessary to periodically change the frictional force when an amplitude t1 of variation of the drive velocity is equal to or lower than a predetermined amplitude T as shown by FIG. 12(*a*). However, when an amplitude t2 of variation of the drive velocity exceeds the predetermined amplitude T as shown by FIG. 12(*b*), the frictional force is adjusted such that the amplitude of variation of the drive velocity is reduced.

Figure 13:
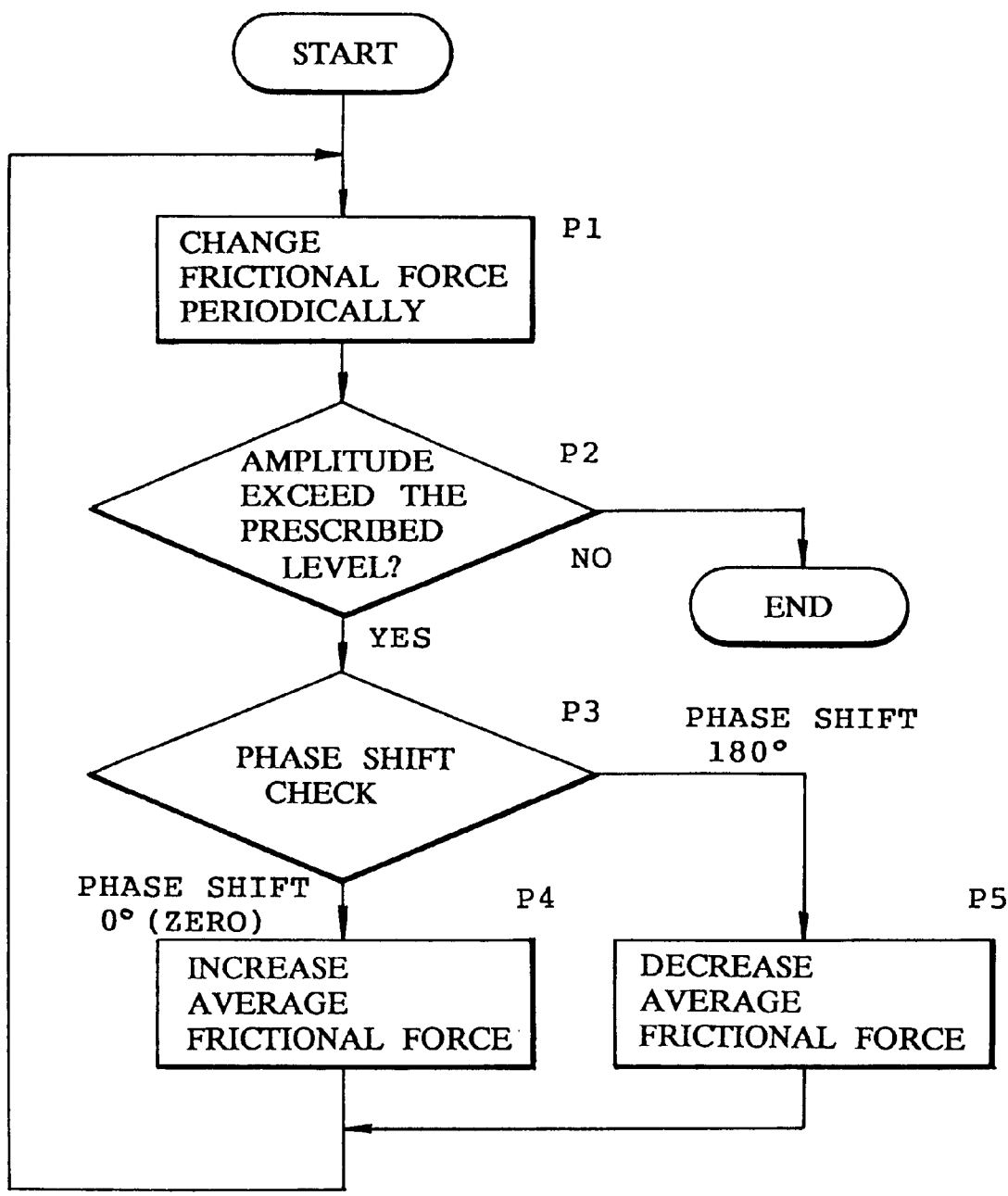
FIG. 13 is a flow chart explaining a flow of processings for adjusting a frictional force in accordance with an amplitude of a variation in a drive velocity.
Figure 14:
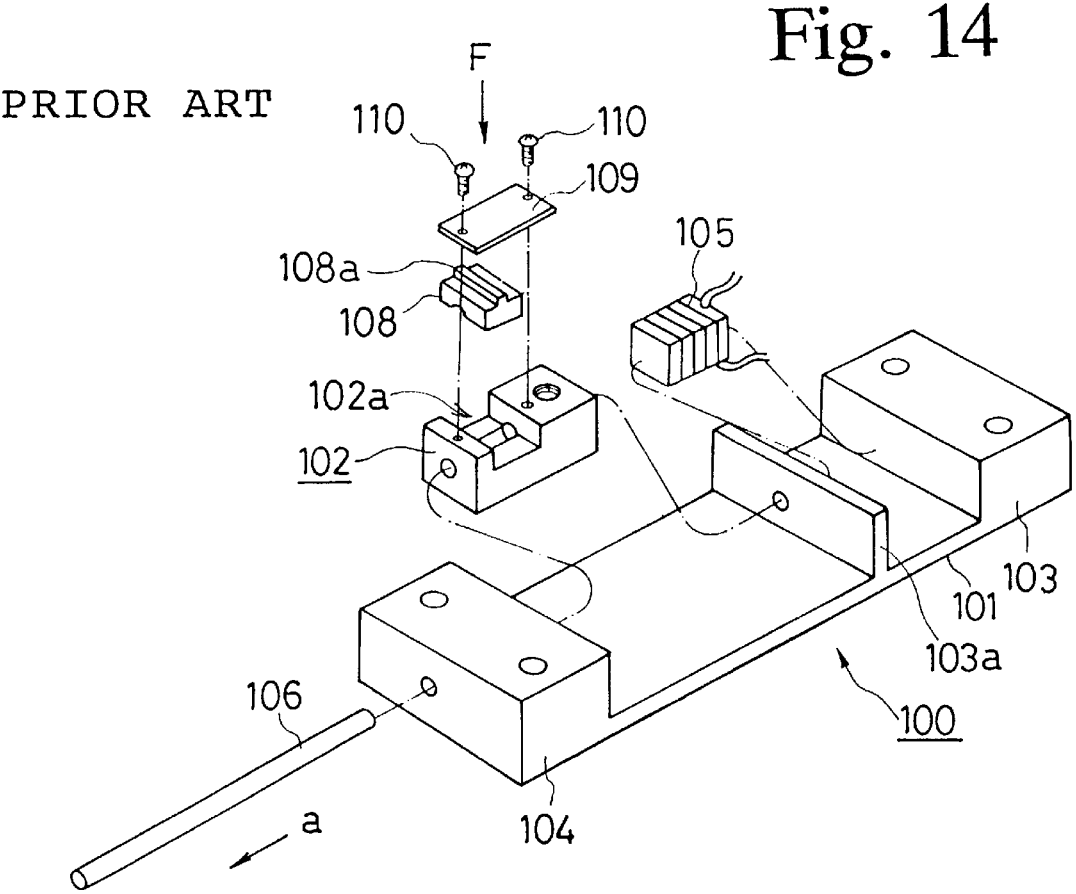
FIG. 14 is a perspective view of disassembled constituent members of a conventional actuator.
Figure 15:
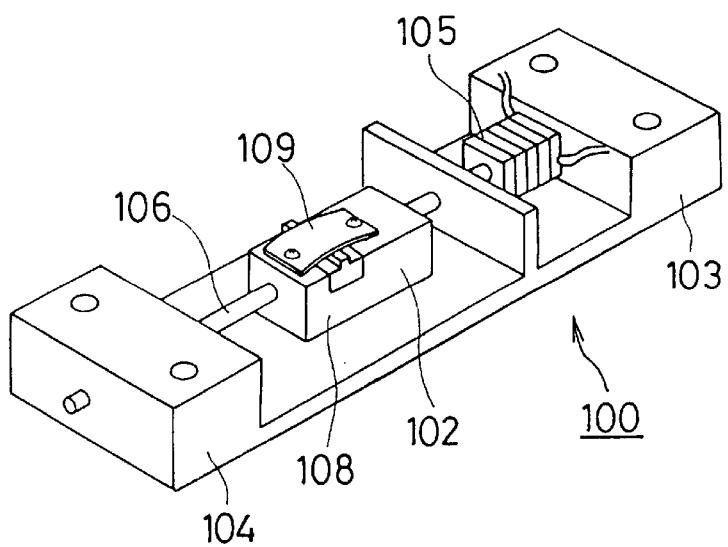
FIG. 15 is a perspective view showing an assembled state of the conventional actuator.

FIG. 13 is a flow chart for explaining flow of processings for adjusting the frictional force in accordance with the amplitude of variation of the drive velocity. First, the frictional force between the slider block and the drive shaft is periodically changed (step P1). Next, whether the amplitude of variation of the drive velocity exceeds a prescribed level is determined (step P2) and when the amplitude does not exceed the prescribed level, the processings are finished. When the amplitude exceeds the prescribed level, a shift between a phase of variation of the drive velocity and a phase of variation of the frictional force is determined (step P3) and when the shift between the phases is 0°, that is, there is no shift of phases, the frictional force is adjusted such that an average frictional force is increased (step P4). Further, when the shift between the phase of variation of the drive velocity and the phase of variation of the frictional force is 180°, the frictional force is adjusted such that the average frictional force is decreased (step P5). Thereby, the amplitude of variation of the drive velocity can be reduced.

As has been explained, according to the present invention, when in a drive device using an electromechanical transducer, a drive member fixedly coupled to the electromechanical transducer, a driven member frictionally coupled to the drive member and a frictional member frictionally coupled to the drive member by being fitted to an opening of the driven member, an elastic member is arranged in a gap for fitting the frictional member fitted to the opening of the driven member and the driven member, the gap can be eliminated between the driven member and the frictional member fitted to the opening of the driven member and therefore, the drive energy received from the drive member can efficiently transmitted to the driven member and loss of drive energy can be dispensed with.

Further, when such a drive device using an electromechanical transducer comprises variable frictional force generating means for changing the magnitude of the frictional force between the drive member and the driven member at intervals of predetermined time periods, moving velocity detecting means for detecting a variation of the moving velocity of the driven member in synchronism with the predetermined time and frictional force control means for comparing the width of varying the moving velocity with a width of variation of predetermined moving velocity in synchronism with the predetermined time and adjusting the magnitude of the frictional force generated by the variable frictional force generating means based on the result, even if variation of load is significant, the frictional force of the frictional coupling portions can be adjusted in accordance with load and therefore, the device can always be driven at high drive efficiency.

When a drive device using an electromechanical transducer, is provided with frictional force applying means for increasing the frictional force between the drive member and the driven member when the drive member is stopped, the frictional force between the drive member and the driven member is increased by the frictional force applying means when the drive member is stopped and a force for holding the driven member when the drive member is stopped, is controlled to increase, the drive device can be prevented from being destructed by moving the driven member unpreparedly by being applied with unintentional external force to the driven member or members driven by the drive device can be prevented from being destructed.

What is claimed is:

1. A drive device using an electromechanical transducer, said device comprising:

an electromechanical transducer for generating elongation and contraction displacements in predetermined directions;

a drive member fixedly coupled to the electromechanical transducer for displacing along with the electromechanical transducer;

a driven member frictionally coupled to the drive member;

a frictional member for frictionally coupling to the drive member by being fitted to an opening of the driven member; and an elastic member arranged in a gap of fitting the frictional member fitted to the opening of the driven member and the frictional member.

2. The drive device using an electromechanical transducer according to claim 1, wherein the elastic member arranged in the gap of fitting the frictional member fitted to the opening of the driven member and the frictional member, is an elastic member constituted by a material having a spring constant k having a value specified below $$k > F/10x$$

where the spring constant of the elastic member in a direction of displacing the electromechanical transducer is designated by a notation k, a frictional force between the drive member and the driven member is designated by a notation F and a displacement of the electromechanical conversion element is designated by a notation x.

3. The drive device using an electromechanical transducer according to claim 1, wherein the elastic member arranged in the gap for fitting the frictional member fitted to the opening of the driven member and the frictional member is constituted by one kind or two kinds or more of materials selected from the group consisting urethane resin, silicone resin, vinyl resin, polyamideimide resin and rubber.

4. A drive device using an electromechanical transducer, said device comprising:

an electromechanical transducer for generating elongation and contraction displacements in predetermined directions;

a drive member fixedly coupled to the electromechanical transducer for displacing along with the electromechanical transducer;

a driven member frictionally coupled to the drive member;

variable frictional force generating means for changing a magnitude of a frictional force between the drive member and the driven member at predetermined time intervals;

moving velocity detecting means for detecting a variation in a moving velocity of the driven member in synchronism with the predetermined time intervals; and frictional force control means for comparing an amplitude of the variation detected by the moving velocity detecting means with a predetermined amplitude in synchronism with the predetermined time intervals and adjusting a magnitude of a frictional force generated by the frictional force generating means based on a result thereof.

5. The drive device using an electromechanical transducer according to claim 4, wherein the variable frictional force generating means is provided with a second electromechanical transducer for adjusting a force for pressing the driven member to the drive member and a voltage control means for periodically changing a voltage applied to the second electromechanical transducer.

6. A drive device using an electromechanical transducer, said device comprising:

an electromechanical transducer for generating elongation and contraction displacements in predetermined directions;

a drive member fixedly coupled to the electromechanical transducer for displacing along with the electromechanical transducer;

a driven member frictionally coupled to the drive member;

frictional force applying means for increasing a frictional force between the drive member and the driven member when the drive member is stopped; and drive control means for increasing the frictional force between the drive member and the driven member by controlling the frictional force applying means when the drive member is stopped to increase the frictional force.

7. The drive device using an electromechanical transducer according to claim 6, wherein the frictional force applying means is provided with an electromechanical transducer for displacing the driven member in a direction of increasing the frictional force between the drive member and the driven member, and the drive control means controls the frictional force applying means to drive the electromechanical transducer to displace the driven member by applying a predetermined voltage to the electromechanical transducer when the drive member is stopped, whereby the frictional force for holding the driven member is increased.

8. A drive device using an electromechanical transducer, said device comprising:

a first electromechanical transducer for generating elongation and contraction displacements in predetermined directions;

a drive member fixedly coupled to the first electromechanical transducer for displacing along with the first electromechanical transducer;

a driven member frictionally coupled to the drive member;

variable frictional force generating means having a second electromechanical transducer for changing a magnitude of a frictional force between the drive member and the driven member;

frictional force applying means having a third electromechanical transducer for increasing the frictional force between the drive member and the driven member when the drive member is stopped; and drive control means for driving the drive member by generating the elongation and the contraction displacements by applying drive pulses to the first electromechanical transducer, adjusting the frictional force between the drive member and the driven member by periodically changing a voltage applied to the second electromechanical transducer and increasing a force for holding the driven member when the drive member is stopped by increasing the frictional force between the drive member and the driven member by applying a predetermined voltage to the third electromechanical transducer when the drive member is stopped.

9. A drive device using an electromechanical transducer, said device comprising:

an electromechanical transducer for generating elongation and contraction displacements in predetermined directions;

a guide member having a guide surface extended in said predetermined directions;

a driven member frictionally coupled to the guide member and driven in said predetermined directions by said electromechanical transducer;

a frictional member for frictionally coupling to the guide surface of the guide member by being fitted to an opening of the driven member; and an elastic member arranged in a gap of fitting the frictional member fitted to the opening of the driven member and the frictional member.

10. A drive device using an electromechanical transducer, said device comprising:

a first electromechanical transducer for generating elongation and contraction displacements in predetermined directions;

a guide member having a guide surface extended in said predetermined directions;

a driven member frictionally coupled to the guide member and driven in said predetermined directions by said electromechanical transducer; and a second electromechanical transducer for decreasing a frictional force between the guide member and the driven member, when a voltage is applied to said second electromechanical transducer.

11. The drive device according to claim 10, further comprising:

a controller for supplying electric energy to the second electromechanical transducer and changing a magnitude of the frictional force between the guide member and the driven member.

12. A driving method for driving a driven member along a guide surface using an electromechanical transducer, comprising the steps of:

coupling a driven member with a guide member having a guide surface extended in a predetermined direction;

adjusting a frictional force between the driven member and the guide member by a first electromechanical transducer; and driving the driven member by a second electromechanical transducer, wherein the second electromechanical transducer produces repeatable linear displacements in a predetermined direction.

13. A driving method according to claim 12, wherein said first electromechanical transducer decreases a frictional force between the guide member and the driven member.

14. A driving method according to claim 12, wherein said first electromechanical transducer adjusts a frictional force between the guide member and the driven member in synchronism with the repeatable linear displacements of the second electromechanical transducer.

* * * * *